US012679335B2

(12) United States Patent
Yamasaki et al.

(10) Patent No.: US 12,679,335 B2
(45) Date of Patent: Jul. 14, 2026

(54) VEHICLE MOVEMENT CONTROL DEVICE AND VEHICLE MOVEMENT CONTROL METHOD

(71) Applicant: Hitachi Astemo, Ltd., Hitachinaka (JP)

(72) Inventors: Masaru Yamasaki, Tokyo (JP); Takahiro Ito, Tokyo (JP); Kenta Maeda, Tokyo (JP); Shuji Ohshita, Hitachinaka (JP); Kentarou Ueno, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 267 days.

(21) Appl. No.: 18/039,869

(22) PCT Filed: Nov. 10, 2021

(86) PCT No.: PCT/JP2021/041344
§ 371 (c)(1),
(2) Date: Jun. 1, 2023

(87) PCT Pub. No.: WO2022/130840
PCT Pub. Date: Jun. 23, 2022

(65) Prior Publication Data
US 2024/0001910 A1      Jan. 4, 2024

(30) Foreign Application Priority Data

Dec. 18, 2020      (JP) ................................. 2020-209954

(51) Int. Cl.
B60W 30/02          (2012.01)
B60W 50/06          (2006.01)

(52) U.S. Cl.
CPC ............ B60W 30/02 (2013.01); B60W 50/06 (2013.01); B60W 2520/125 (2013.01);
(Continued)

(58) Field of Classification Search
CPC ................. B60W 30/02; B60W 50/06; B60W 2520/125; B60W 2520/14;
(Continued)

(56) References Cited

U.S. PATENT DOCUMENTS 10,384,672 B1 *   8/2019   Katzourakis .......... B60W 10/22
11,117,559 B2 *   9/2021   Takahashi ............... B60T 8/321
(Continued)

FOREIGN PATENT DOCUMENTS

CN          103968976 A      8/2014
CN          110871812 A      3/2020
(Continued)

OTHER PUBLICATIONS

International Search Report, PCT/JP2021/041344, Feb. 1, 2022, pgs.
(Continued)

*Primary Examiner* — Abby J Flynn
*Assistant Examiner* — Leah N Miller
(74) *Attorney, Agent, or Firm* — Volpe Koenig

(57) ABSTRACT

A vehicle movement control device generates a target motion vector that falls within a desired controllable range in a motion space, and integrally controls a plurality of actuators to realize a vehicle movement defined by the target motion vector, thereby improving ride comfort and operation feeling. The vehicle movement control device that controls the plurality of actuators in accordance with a travel state, the vehicle movement control device including: a vehicle movement planning unit configured to generate a target motion vector based on input travel state information; an operation amount arbitration unit configured to calculate an operation amount of each actuator based on the target motion vector; and an actuator control unit configured to control each actuator based on the operation amount, in
(Continued)

DURING ACCELERATION TRAVELING

CONTROLLABLE RANGE IN MOTION SPACE

NARROWED BY CONTROLLING OUTPUT OF ACTUATOR (a)

(b)

which the vehicle movement planning unit generates the target motion vector within a controllable range in a motion space acquired from the operation amount arbitration unit.

18 Claims, 10 Drawing Sheets

(52) U.S. Cl.
CPC ..... *B60W 2520/14* (2013.01); *B60W 2520/16* (2013.01); *B60W 2520/18* (2013.01); *B60W 2540/00* (2013.01); *B60W 2552/00* (2020.02)

(58) Field of Classification Search
CPC ......... B60W 2520/16; B60W 2520/18; B60W 2540/00; B60W 2552/00; B60W 2720/106; B60W 2720/125; B60W 2720/14; B60W 2720/16; B60W 10/08; B60W 10/184; B60W 10/20; B60W 10/22; B60W 2050/0094; B60W 2720/18; B60W 40/11; B60W 40/112; B60W 40/114; B60W 30/025; B60L 2220/42; B60L 2220/44; B60L 2220/46; B60L 2240/12; B60L 2240/16; B60L 2240/18; B60L 2240/20; B60L 2240/22; B60L 2240/24; B60L 2240/32; B60L 2240/421; B60L 2240/423; B60L 2270/145; B60L 15/20

USPC .......................................................... 701/36
See application file for complete search history.

(56) References Cited

U.S. PATENT DOCUMENTS

| | | | |
|---|---|---|---|
| 2011/0066344 A1 | | 3/2011 | Niwa et al. |
| 2013/0079988 A1 | | 3/2013 | Hirao et al. |
| 2015/0032332 A1* | | 1/2015 | Kikuchi .............. B60W 30/025 |
| | | | 701/37 |
| 2022/0017062 A1 | | 1/2022 | Yamada |

FOREIGN PATENT DOCUMENTS

| | | | |
|---|---|---|---|
| JP | 2011-063098 A | 3/2011 | |
| JP | 2020-152342 A | 9/2020 | |
| WO | WO-2018074048 A1 * | 4/2018 | ........ B60W 50/0097 |

OTHER PUBLICATIONS

Extended European Search Report issued on Oct. 21, 2024 for European Patent Application No. 21906204.9.
Chinese Office Action issued on Sep. 2, 2025 for Chinese Patent Application No. 202180083660.9.

* cited by examiner

DURING CONSTANT SPEED TRAVELING

CONTROLLABLE RANGE IN MOTION SPACE $Az$ $Ax$ $Ay$ (a)

$Az$

CONTROLLABLE IN ALL DIRECTIONS $Ax$ (b)

DURING ACCELERATION TRAVELING

CONTROLLABLE RANGE IN MOTION SPACE $Az$ $Ax$ $Ay$ (a)

$Az$

NARROWED BY CONTROLLING OUTPUT OF ACTUATOR $Ax$ (b)

(a) DRIVER OPERATION INFORMATION (a1) STEERING (a2) ACCELERATION PEDAL (a3) DECELERATION PEDAL (b) TARGET MOTION VECTOR (b1) LATERAL ACCELERATION Ay (b2) FRONT-REAR ACCELERATION Ax (b3) VERTICAL ACCELERATION Az (b4) ROLL ANGLE $\phi$ (b5) PITCH ANGLE $\theta$ (b6) YAW RATE r

FIG. 11

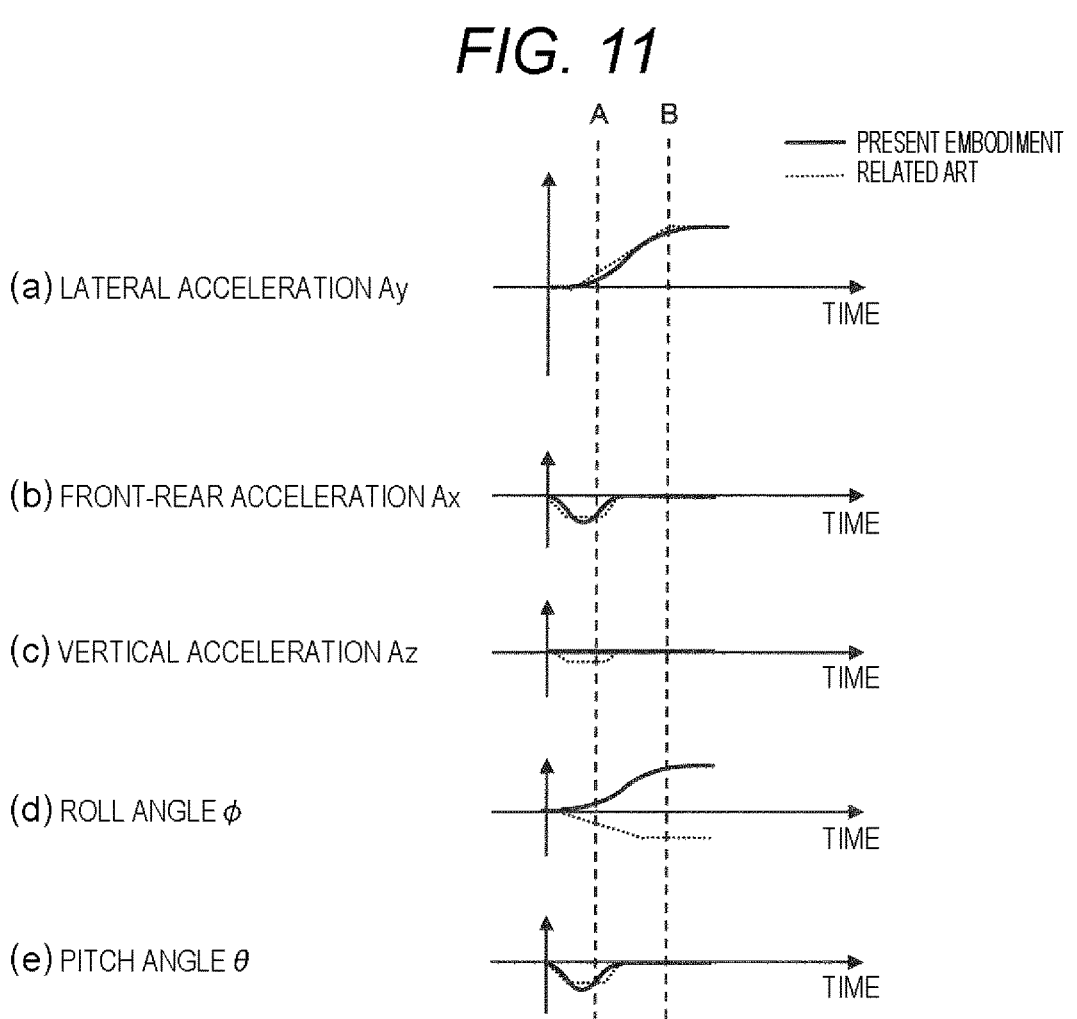

(a) LATERAL ACCELERATION Ay (b) FRONT-REAR ACCELERATION Ax (c) VERTICAL ACCELERATION Az (d) ROLL ANGLE $\phi$ (e) PITCH ANGLE $\theta$

— PRESENT EMBODIMENT
······ RELATED ART

FIG. 12

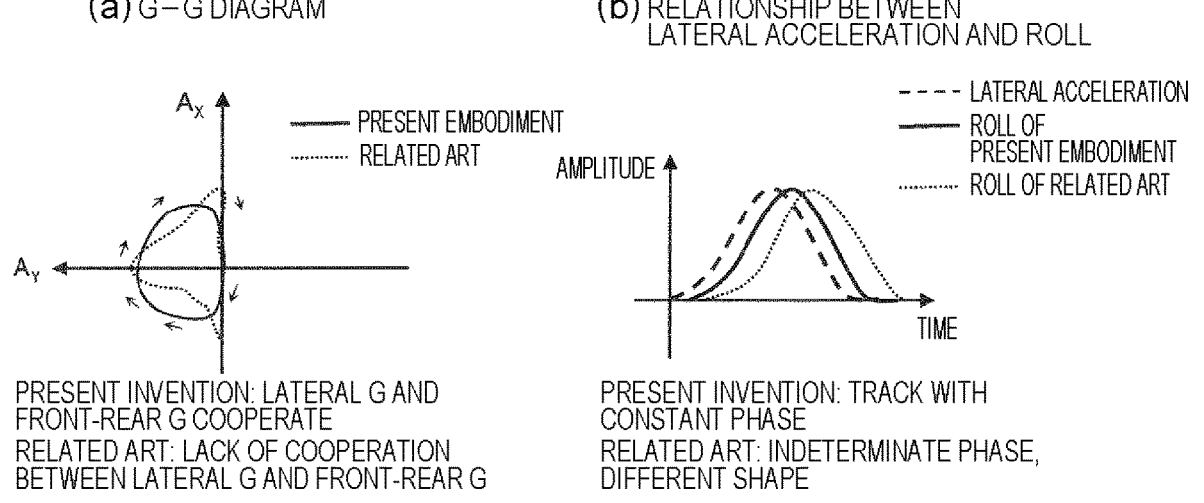

(a) G−G DIAGRAM

PRESENT INVENTION: LATERAL G AND
FRONT-REAR G COOPERATE
RELATED ART: LACK OF COOPERATION
BETWEEN LATERAL G AND FRONT-REAR G (b) RELATIONSHIP BETWEEN
LATERAL ACCELERATION AND ROLL

PRESENT INVENTION: TRACK WITH
CONSTANT PHASE
RELATED ART: INDETERMINATE PHASE,
DIFFERENT SHAPE

VEHICLE MOVEMENT CONTROL DEVICE AND VEHICLE MOVEMENT CONTROL METHOD

TECHNICAL FIELD

The present invention relates to a vehicle movement control device and a vehicle movement control method for optimizing a vehicle movement in accordance with a travel state by integrally controlling each actuator mounted on an automobile.

BACKGROUND ART

In recent years, an automobile has been required to further improve ride comfort of an occupant and operation feeling of a driver, and a technique for controlling a vehicle movement by arbitrating a plurality of control requests has been proposed.

For example, the abstract of PTL 1 describes that, "in a control platform 10, a position control request arbitration unit 21 arbitrates and outputs a plurality of control requests of which dimensions are positions, and a position control request conversion unit 22 converts the control request from the position control request arbitration unit 21 into a control request of which dimension is speed, and outputs the control request. Then, a speed control request arbitration unit 31 arbitrates and outputs a plurality of control requests of which dimensions are speed, and a speed control request conversion unit 32 converts the control request from the speed control request arbitration unit 31 into a control request of which dimension is an acceleration and outputs the control request. Further, an acceleration control request arbitration unit 41 arbitrates and outputs a plurality of control requests of which dimensions are the acceleration, and an acceleration control request conversion unit 42 converts a control request from the acceleration control request arbitration unit 41 into a control request of a dimension (for example, torque) corresponding to a control device that realizes acceleration control, and outputs the control request". In addition, FIG. 1 of PTL 1 illustrates a coupling relationship of the position control request arbitration unit 21, the speed control request arbitration unit 31, the acceleration control request arbitration unit 41, and the like in the control platform 10.

That is, PTL 1 discloses a control request arbitration device that arbitrates a plurality of position control requests to create a speed control request, arbitrates a plurality of speed control requests to create an acceleration control request, and arbitrates a plurality of acceleration control requests to create a torque control request.

PATENT LITERATURE

Citation List

PTL 1: JP 2011-63098 A

SUMMARY OF INVENTION

Technical Problem

When the automobile travels, in addition to each control of driving and braking, steering control for turning is also executed. When the vehicle starts steering, vehicle movements such as a lateral acceleration, rolling, pitching, and a yaw rate are passively generated with a delay from the steering due to mechanical characteristics of the vehicle, and ride comfort and operation feeling are deteriorated. Therefore, there is a demand for a vehicle movement control device that improves ride comfort and operation feeling at the time of steering by actively controlling the vehicle movement in accordance with the travel state.

Here, since the control platform of PTL 1 is intended to control driving and braking of the vehicle traveling straight and does not consider steering control, arbitration of the steering control request with each control request of position, speed, and acceleration has not been considered. In addition, in PTL 1, since an arbitration order of each control request is limited to the above order and cannot be arbitrarily set, when the steering control request is included in the arbitration target, it is necessary to perform a difficult design in which the arbitration order of the steering control request that occurs only intermittently is incorporated at an appropriate position in the hierarchy of the continuously occurring position control request, speed control request, and acceleration control request.

In view of such a problem, an object of the present invention is to provide a vehicle movement control device and a vehicle movement control method for improving ride comfort and operation feeling by generating a target motion vector that falls within a desired controllable range in a motion space and integrally controlling an operation amount of each actuator to realize a vehicle movement defined by the target motion vector.

Solution to Problem

In order to solve the above problem, a vehicle movement control device according to the present invention is a vehicle movement control device that controls a vehicle movement by integrally controlling a plurality of actuators in accordance with a travel state, the vehicle movement control device including: a vehicle movement planning unit configured to generate a target motion vector based on input travel state information; an operation amount arbitration unit configured to calculate an operation amount of each actuator based on the target motion vector; and an actuator control unit configured to control each actuator based on the operation amount, in which the vehicle movement planning unit generates the target motion vector within a controllable range in a motion space acquired from the operation amount arbitration unit.

In addition, a vehicle movement control method of the present invention is a vehicle movement control method for controlling a vehicle movement by integrally controlling a plurality of actuators in accordance with a travel state, the method including: a first step of generating a target motion vector within a controllable range in a motion space based on input travel state information; a second step of calculating an operation amount of each actuator based on the target motion vector; and a third step of controlling each actuator based on the operation amount.

Advantageous Effects of Invention

According to the vehicle movement control device and the vehicle movement control method of the present invention, a target motion vector that falls within a desired controllable range in a motion space is generated, and an operation amount of each actuator is integrally controlled to realize a vehicle movement defined by the target motion vector, thereby improving ride comfort and operation feeling.

BRIEF DESCRIPTION OF DRAWINGS

FIG. 11 is a graph illustrating a difference between effects of the present invention and the related art.

FIG. 12 is a graph illustrating a difference between effects of the present invention and the related art.

DESCRIPTION OF EMBODIMENTS

Hereinafter, an embodiment of a vehicle movement control device of the present invention will be described with reference to the drawings.

A vehicle movement control device according to the embodiment of the present invention will be described with reference to FIGS. 1 to 10.

<Schematic Configuration of Vehicle 1>

Figure 1:
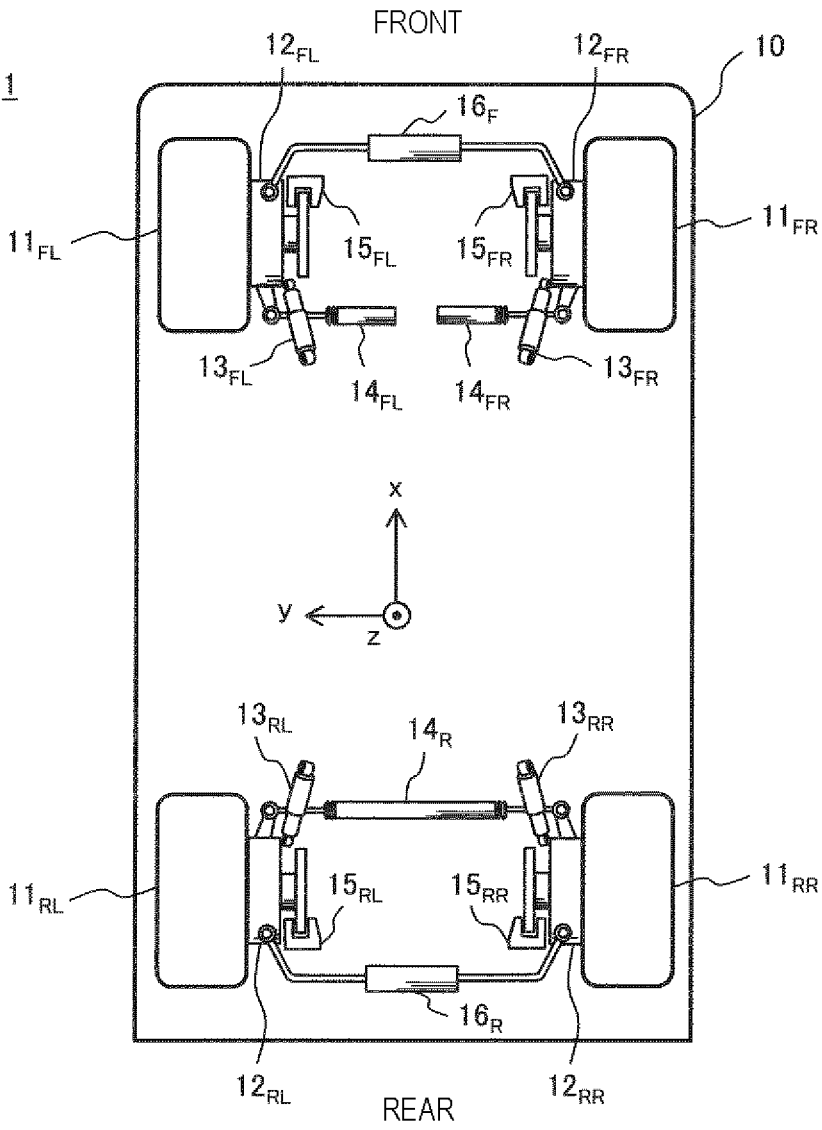
FIG. 1 is a plan view illustrating a schematic configuration of a vehicle according to an embodiment.

FIG. 1 is a plan view illustrating a schematic configuration of a vehicle 1 according to the present embodiment. As illustrated herein, in the vehicle 1, wheels 11, motors 12, suspensions 13, steers 14, brakes 15, and stabilizers 16 are mounted on a vehicle body 10. Hereinafter, a front-rear direction of the vehicle 1 is an x-axis (a front direction is positive), a lateral direction is a y-axis (a left direction is positive), and a vertical direction is a z-axis (an upper direction is positive).

The wheels 11 support the vehicle body 10 and exert a grip force by coming into contact with a road surface, and in the present embodiment, include four wheels of a left front wheel $11_{FL}$, a right front wheel $11_{FR}$, a left rear wheel $11_{RL}$, and a right rear wheel $11_{RR}$. In the following description, a reference sign of a configuration corresponding to the left front wheel $11_{FL}$ is denoted by $_{FL}$, a reference sign of a configuration corresponding to the right front wheel $11_{FR}$ is denoted by $_{FR}$, a reference sign of a configuration corresponding to the left rear wheel $11_{RL}$ is denoted by $_{RL}$, and a reference sign of a configuration corresponding to the right rear wheel $11_{RR}$ is denoted by $_{RR}$. In addition, a reference sign of a configuration corresponding to both the left front wheel $11_{FL}$ and the right front wheel $11_{FR}$ is denoted by $_F$, and a reference sign of a configuration corresponding to both the left rear wheel $11_{RL}$ and the right rear wheel $11_{RR}$ is denoted by $_R$.

In-wheel type motors 12 ($12_{FL}$, $12_{FR}$, $12_{RL}$, and $12_{RR}$) are attached to each of the wheels 11, and each of the wheels 11 independently rotate (forward rotation and reverse rotation) by these motors 12.

The suspensions 13 ($13_{FL}$, $13_{FR}$, $13_{RL}$, and $13_{RR}$) are provided between each motor 12 and the vehicle body 10, and these suspensions 13 constitute a suspension device that absorbs vibration and impact generated in each wheel 11 and improves the stability and ride comfort of the vehicle body. Note that the suspension 13 is a coilover including a spring and a shock absorber, and is, for example, a semi-active suspension in which a damper capable of changing viscosity and a coil spring are combined, an active suspension in which a damper capable of arbitrating a length and a coil spring are combined, or an electric suspension using a linear motor or a combination of a rotation motor and a rotation linear motion mechanism, and the like. Hereinafter, the suspension 13 will be described as an active suspension.

The steers 14 are devices for steering the wheels 11 to determine a traveling direction of the vehicle 1, and in the present embodiment, include three steers: a steer $14_{FL}$ that steers the left front wheel $11_{FL}$, a steer $14_{FR}$ that steers the right front wheel $11_{FR}$, and a steer $14_R$ that steers the left rear wheel $11_{RL}$ and the right rear wheel $11_{RR}$.

The brakes 15 are devices for braking the rotation of the wheels 11, and in the present embodiment, include four brakes: a brake $15_{FL}$ for the left front wheel $11_{FL}$, a brake $15_{FR}$ for the right front wheel $11_{FR}$, a brake $15_{RL}$ for the left rear wheel $11_{RL}$, and a brake $15_{RR}$ for the right rear wheel $11_{RR}$.

The stabilizers 16 are devices that move in conjunction with the vertical movement of the left and right wheels to suppress a roll amount of the vehicle, and the stabilizers 16 of the present embodiment are control stabilizers that can electrically arbitrate a torsion angle. In the present embodiment, two stabilizers, a front stabilizer 16F and a rear stabilizer 16R, are provided.

<Jack-Up Force Jx by Braking/Driving Force Fx>

Here, the jack-up force Jx applied to the vehicle body 10 by the driving force or the braking force (hereinafter, referred to as "braking/driving force Fx") of each wheel in the vehicle 1 during acceleration will be described with reference to FIG. 2. The expression "jack-up force" includes a positive jack-up force that is an upward force and a negative jack-up force that is a downward force.

Figure 2:
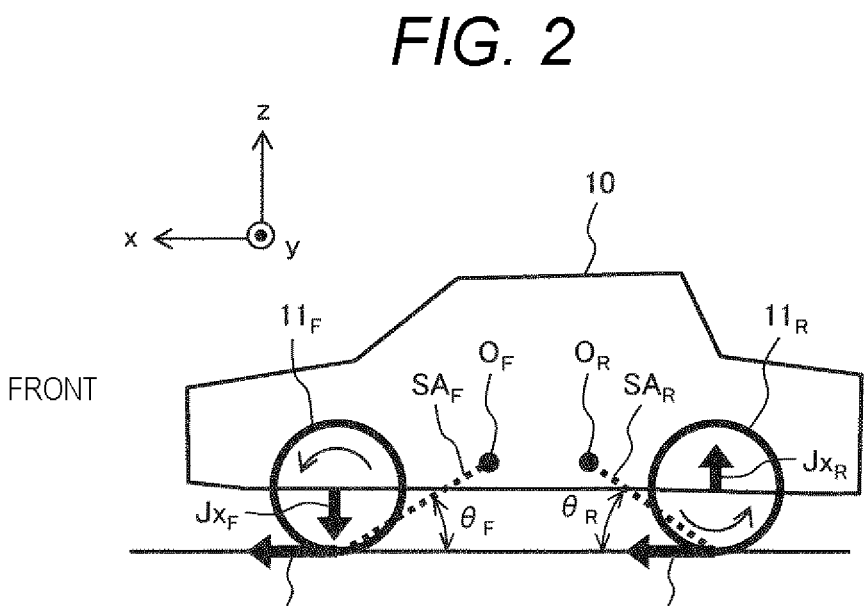
FIG. 2 is a side view of the vehicle for explaining a jack-up force generated by a braking/driving force.

FIG. 2 is a side view of the vehicle 1 accelerating forward, and the front wheel $11_F$ and the rear wheel $11_R$ rotate in an arrow direction in the drawing. In this case, as a reaction of the rotation of the wheels 11, the road surface applies a forward braking/driving force $Fx_F$ to the front wheel $11_F$ and also applies a forward braking/driving force $Fx_R$ to the rear wheel $11_R$. Since the front wheel $11_F$ rotates around a front instantaneous rotation center OF by the front braking/driving force $Fx_F$, a jack-up force $Jx_F$ in a downward direction is generated on the front side of the vehicle body 10. On the other hand, since the wheel $11_R$ rotates around a rear instantaneous rotation center $O_R$ by the rear braking/driving force $Fx_R$, a jack-up force $Jx_R$ in an upward direction is generated on the rear side of the vehicle body 10. Due to these jack-up forces Jx, a change (pitching) in a pitch amount passively occurs in the vehicle body 10 during acceleration/deceleration with a delay from the start of acceleration/deceleration.

When a straight line connecting the front instantaneous rotation center $O_F$ and a grounding point of the front wheel $11_R$ is defined as a virtual swing arm $SA_F$ and an angle between the virtual swing arm $SA_F$ and the road surface is defined as OF, magnitude of the jack-up force $Jx_R$ is calculated by Equation 1.

[Mathematical Formula 1]

$$Jx_F = Fx_F \cdot \tan \theta_F \qquad \text{(Equation 1)}$$

Similarly, when a straight line connecting the rear instantaneous rotation center $O_R$ and the grounding point of the rear wheel $11_R$ is defined as a virtual swing arm $SA_R$, and an angle between the virtual swing arm $SA_R$ and the road surface is defined as $\theta_R$, magnitude of the jack-up force $Jx_R$ is calculated by Equation 2.

[Mathematical Formula 2]

$$Jx_R = Fx_R \cdot \tan \theta_R \qquad \text{(Equation 2)}$$

<Jack-Up Force Jy by Lateral Force Fy>

Next, the relationship between the jack-up force Jy applied to the vehicle body 10 by the lateral force Fy of each wheel and the actual vehicle body posture in the vehicle 1 will be described with reference to FIGS. 3A and 3B.

Figure 3A:
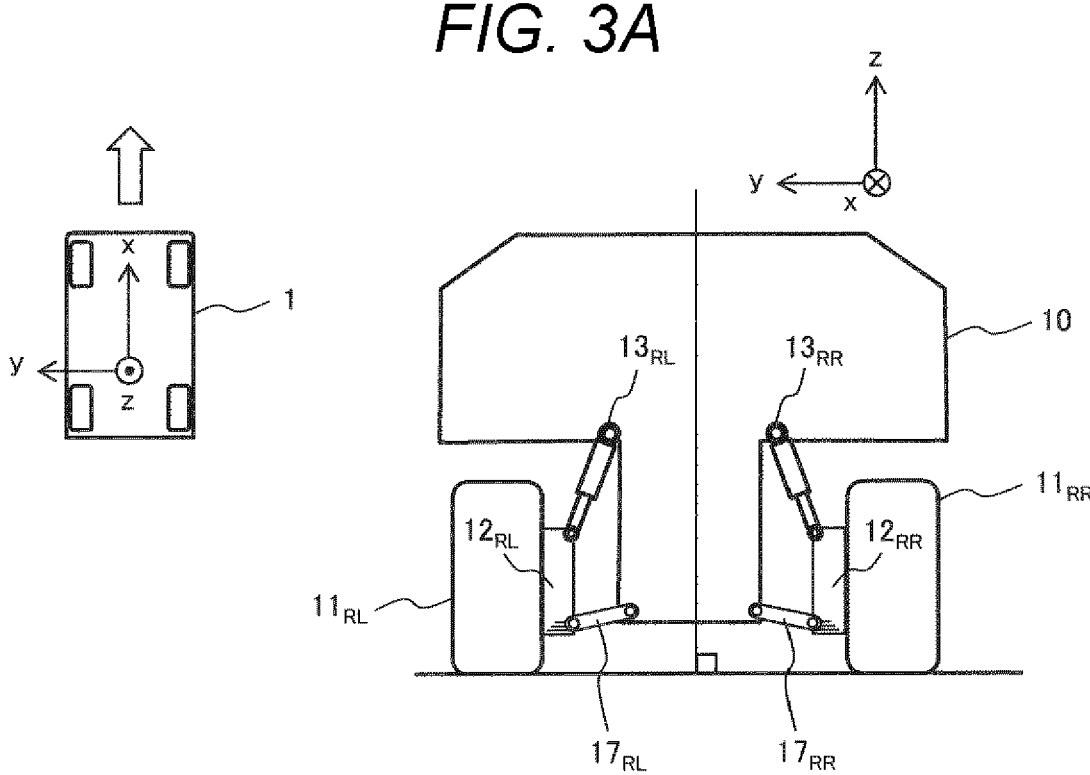
FIG. 3A is a rear view of the vehicle for explaining a jack-up force and an actual vehicle body posture in a case where there is no lateral force.

FIG. 3A is a diagram for explaining a situation where there is no lateral force Fy, and the vehicle 1 in this situation travels straight as illustrated in, for example, a left plan view. In this case, as illustrated in the right rear view, the lateral force Fy is not generated, and the vehicle body 10 maintains a substantially horizontal state. As illustrated in FIG. 3A, in the vehicle 1 of the present embodiment, an upper end of the motor 12 is coupled to the vehicle body 10 via the suspension 13, and a lower end of the motor 12 is coupled to the vehicle body 10 via the lower arm 17.

Figure 3B:
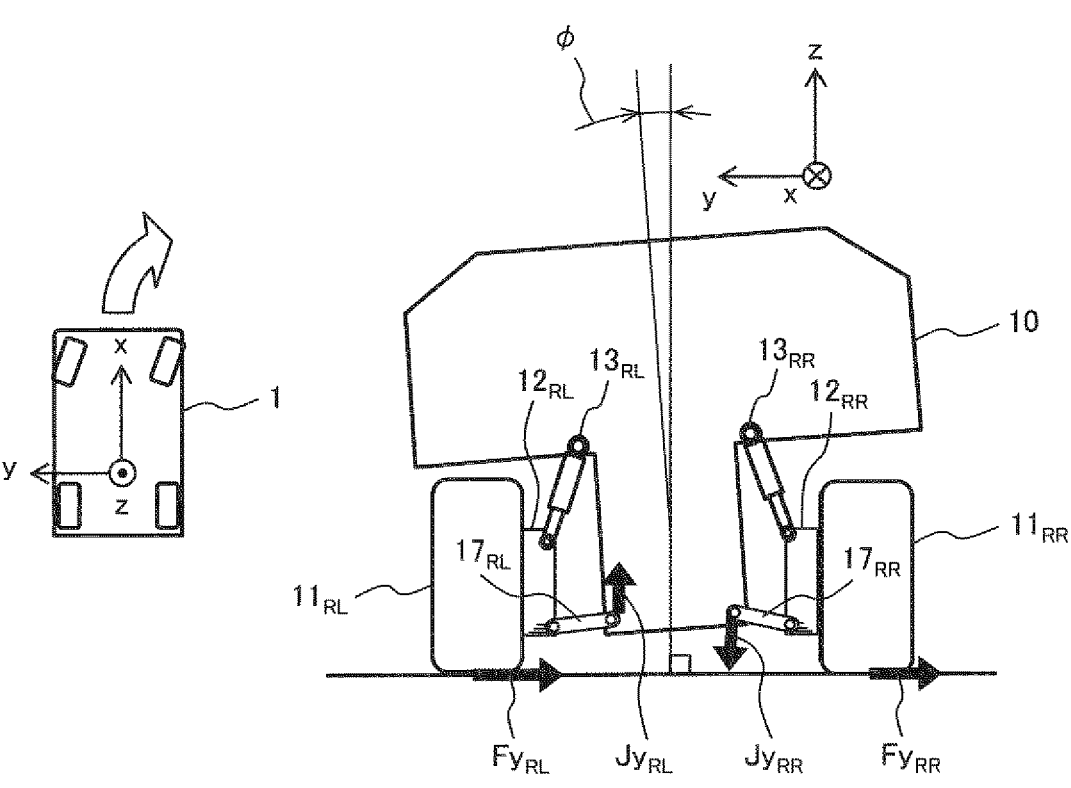
FIG. 3B is a rear view of the vehicle for explaining a jack-up force and an actual vehicle body posture in a case where there is a lateral force.

On the other hand, FIG. 3B is a diagram for explaining a situation where there is the lateral force Fy, and the vehicle 1 in this situation turns right as illustrated in the left plan view, for example. In this case, as illustrated in the right rear view, as a reaction of the steering of the wheel 11, the road surface applies a lateral force $Fy_{RL}$ in the right direction to the left rear wheel $11_{RL}$, and also applies a lateral force $Fy_{RR}$ in the right direction to the right rear wheel $11_{RR}$. Then, the jack-up force $Jy_{RL}$ in the upward direction is generated at the end portion of the lower arm $17_{RL}$ on the vehicle body 10 side by the lateral force $Fy_{RL}$ on the left side. On the other hand, a jack-up force $Jy_{RR}$ in the downward direction is generated at the end portion of the lower arm $17_{RR}$ on the vehicle body 10 side by the lateral force $Fy_{RR}$ on the right side. A change (rolling) in the roll amount passively occurs in the turning vehicle body 10 with a delay from the start of steering by these jack-up forces Jy.

<Schematic Configuration of Vehicle Movement Control Device 2>

Since pitching caused by the braking/driving force Fx during acceleration/deceleration, rolling caused by the lateral force Fy during turning, and the like deteriorate ride comfort of the occupant and operation feeling of the driver, the vehicle movement control device 2 of the present embodiment integrally controls the operation amount of each actuator to optimize the vehicle body posture in accordance with the travel state.

Figure 4:
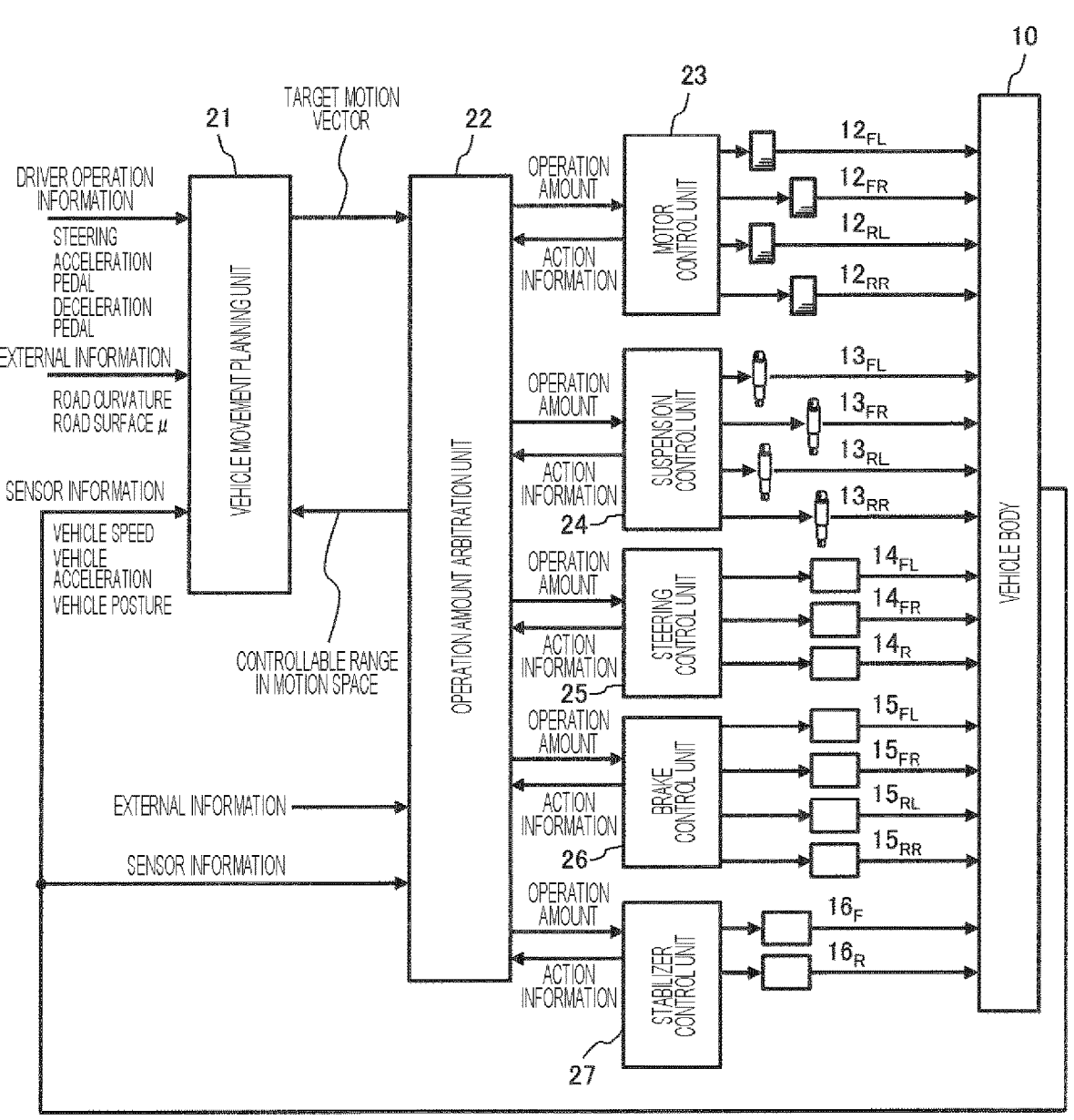
FIG. 4 is a functional block diagram of a vehicle movement control device according to an embodiment.

FIG. 4 is a functional block diagram of the vehicle movement control device 2 of the present embodiment. As illustrated herein, the vehicle movement control device 2 is a control device including a vehicle movement planning unit 21, an operation amount arbitration unit 22, a motor control unit 23, a suspension control unit 24, a steering control unit 25, a brake control unit 26, and a stabilizer control unit 27. Specifically, the vehicle movement control device 2 is a control unit including a computer such as an electronic control unit (ECU) including an arithmetic device such as a CPU, a storage device such as a semiconductor memory, and hardware such as a communication device, and a drive device of each control target. Each unit will be sequentially described below.

<Vehicle Movement Planning Unit 21>

The vehicle movement planning unit 21 plans a target motion vector with six degrees of freedom within a controllable range of a motion vector to be described later based on driver operation information, external information, and sensor information. The driver operation information is, for example, steering information when a driver steers a steering wheel, acceleration pedal information when the acceleration pedal is depressed, deceleration pedal information when the deceleration pedal is depressed, and the like. In addition, the external information is, for example, a road curvature, road surface friction, or the like acquired from a camera or a car navigation system. Further, the sensor information is each piece of information such as a vehicle speed, a vehicle acceleration, and a vehicle posture acquired from a sensor installed in the vehicle body 10.

Here, the motion vector of the present embodiment will be described with reference to FIGS. 5A and 5B.

Figure 5A:
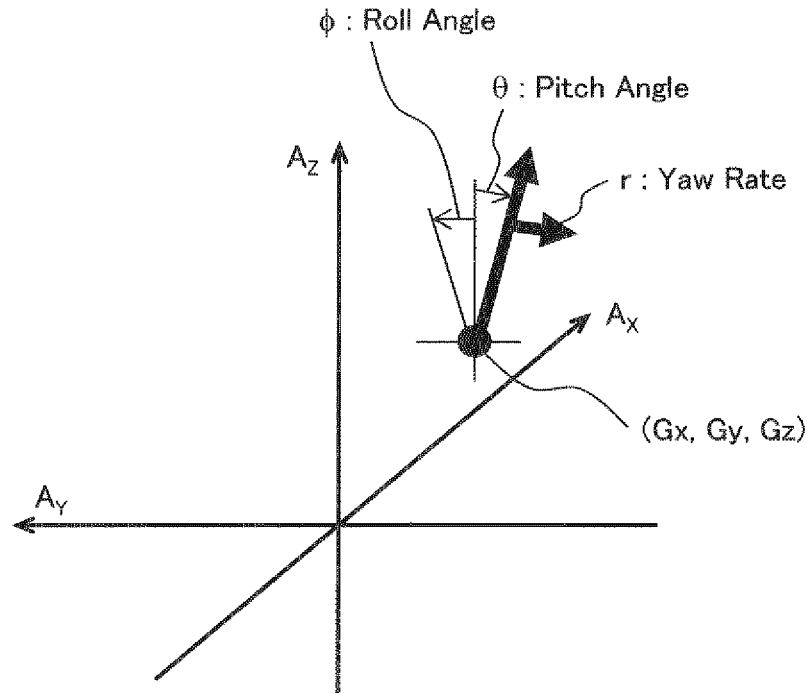
FIG. 5A is a diagram illustrating an example of a motion vector in a motion space.

The motion vector illustrated in FIG. 5A is a vector that defines a vehicle movement with six degrees of freedom, and is a facial vector disposed in a motion space including three axes of a front-rear acceleration Ax, a lateral acceleration Ay, and a vertical acceleration Az. Then, a start point (Gx, Gy, and Gz) of the vector defines an acceleration in each direction of x, y, and z, an inclination with respect to an Ay-Az plane defines a roll angle φ, an inclination with respect to an Az-Ax plane defines a pitch angle θ, and a posture (face orientation) of a vector defines a yaw rate r.

Figure 5B:
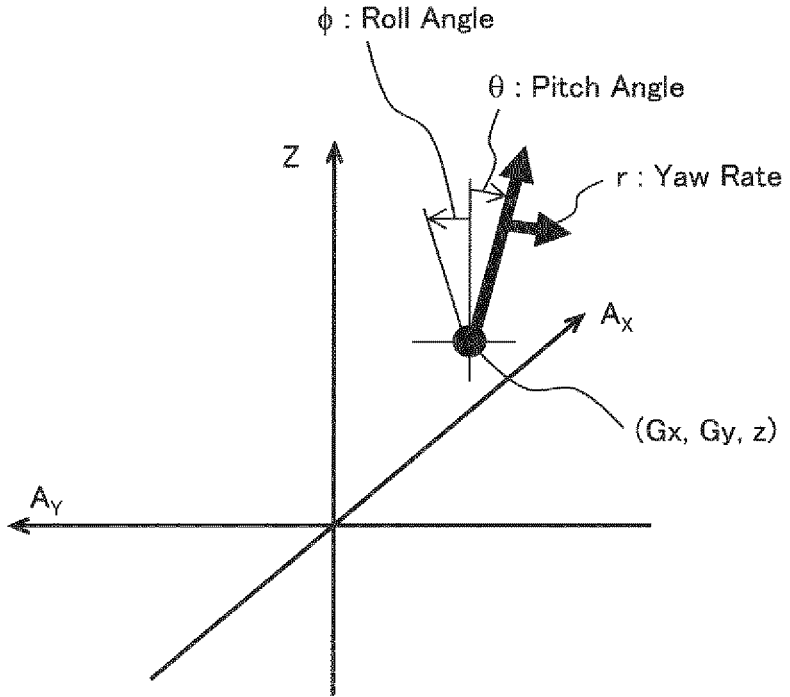
FIG. 5B is a diagram illustrating another example of the motion vector in the motion space.

On the other hand, the motion vector illustrated in FIG. 5B is a vector that defines a vehicle movement with six degrees of freedom different from that in FIG. 5A, and is a facial vector disposed in a motion space including three axes of a front-rear acceleration Ax, a lateral acceleration Ay, and a position Z in the vertical direction. Then, a start point (Gx, Gy, and Z) of the vector defines the front-rear acceleration Ax, the lateral acceleration Ay, and the position z in the vertical direction, an inclination with respect to an Ay-z plane defines the roll angle φ, an inclination with respect to a Z-Ax plane defines the pitch angle θ, and a posture (face orientation) of the vector defines the yaw rate r. Note that the motion vector of the present embodiment is not limited to that illustrated in FIG. 5A or 5B, and may include other parameters.

<Operation Amount Arbitration Unit 22>

The operation amount arbitration unit 22 calculates an operation amount of each actuator based on the external information, the sensor information, and the target motion vector, and calculates a controllable range of the motion vector in the motion space based on action information from each actuator.

Here, an example of the controllable range of the motion vector set in the motion space of FIG. 5A including the three axes of the accelerations Ax, Ay, and Az by the operation amount arbitration unit 22 will be described with reference to FIGS. 6 and 7.

Figure 6:
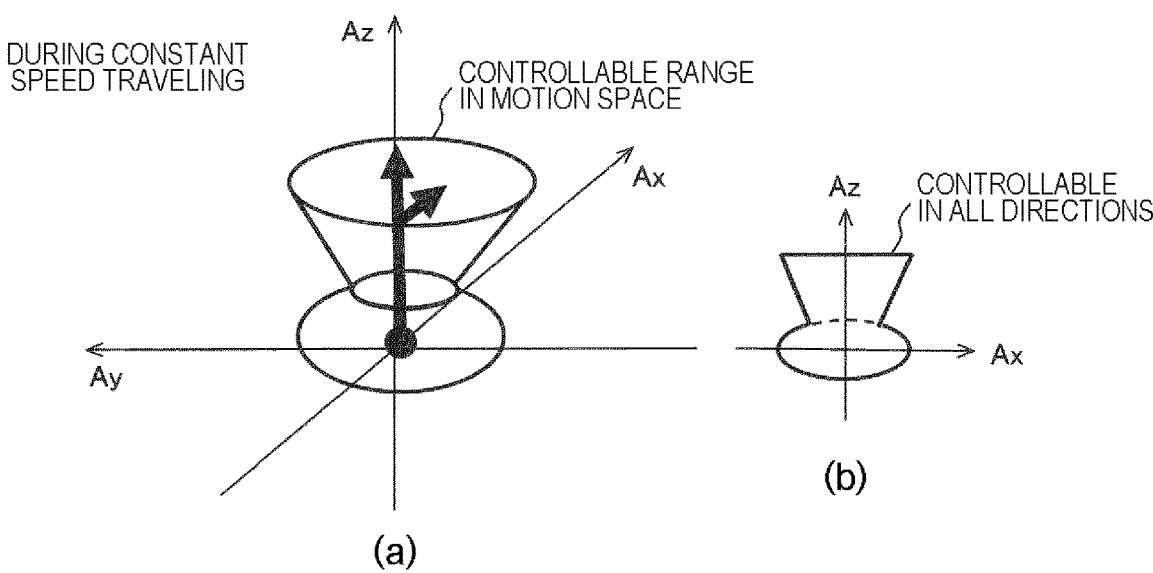
FIG. 6 is a diagram illustrating an example of a controllable range in a motion space during constant speed traveling.
Figure 7:
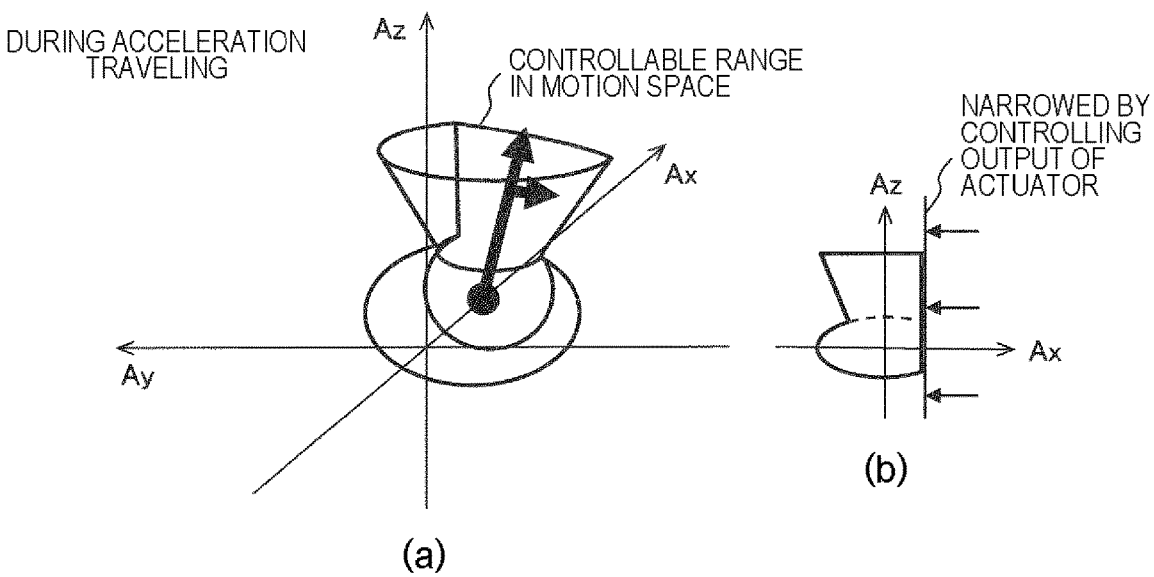
FIG. 7 is a diagram illustrating an example of a controllable range in a motion space during acceleration traveling.

FIG. 6(*a*) illustrates a controllable range of the motion vector set by the operation amount arbitration unit 22 when the vehicle 1 travels at a constant speed, and is an example of an initial value of the controllable range. The controllable range illustrated here is set based on a specification of each actuator, and has, for example, a three-dimensional shape obtained by rotating a keyhole region illustrated in an Ax-Az plane of FIG. 6(b) around the Az axis. Note that, in FIG. 6(a), a lower flat ball portion is a settable range of the start point of the motion vector, and indicates that the accelerations in three directions need to be set within this range. In addition, an upper truncated cone portion is an inclinable range of the motion vector, and indicates that the roll angle φ and the pitch angle θ need to be set within this range. Therefore, when the vehicle 1 is traveling at a constant speed, the vehicle movement planning unit 21 generates a target motion vector that defines the vehicle movement within the controllable range of FIG. 6(a).

On the other hand, FIG. 7(a) illustrates the controllable range of the motion vector set by the operation amount arbitration unit 22 when the vehicle 1 accelerates and travels. During the acceleration of the vehicle 1, for example, a reserve power of the motor 12 that can be used for improving ride comfort and operation feeling is reduced, and thus, as illustrated in FIG. 7(b), an allowable range of a positive value of the front-rear acceleration Ax is narrowed. Therefore, the controllable range in FIG. 7(a) has a three-dimensional shape in which a positive direction side of the Ax axis is eroded as compared with FIG. 6(a). Therefore, when the vehicle 1 is in acceleration traveling, the vehicle movement planning unit 21 generates the target motion vector that defines the vehicle movement within the controllable range of FIG. 7(a) narrower than FIG. 6(a).

<Motor Control Unit 23 to Stabilizer Control Unit 27>

The motor control unit 23 controls each motor 12 based on operation amount information from the operation amount arbitration unit 22. The suspension control unit 24 controls each suspension 13 based on the operation amount information from the operation amount arbitration unit 22. The steering control unit 25 controls each steer 14 based on the operation amount information from the operation amount arbitration unit 22. The brake control unit 26 controls each brake 15 based on the operation amount information from the operation amount arbitration unit 22. The stabilizer control unit 27 controls each stabilizer 16 based on the operation amount information from the operation amount arbitration unit 22.

Here, considering the principle described with reference to FIG. 2 in which the braking/driving force Fx generates pitching, it can be seen that desired pitching can be actively generated by appropriately individually controlling the motor 12 and the brake 15. In addition, considering the principle described with reference to FIG. 3B in which the lateral force Fy causes rolling, it can be seen that desired rolling can be actively generated by appropriately individually controlling the steer 14. Furthermore, by appropriately controlling each of the suspensions 13 and the stabilizers 16, desired pitching or rolling can be actively generated. That is, it can be seen that the operation amount arbitration unit 22 can positively generate desired pitching or rolling by appropriately arbitrating the operation amount of each actuator.

In addition, the motor control unit 23 transmits the action information of each motor 12 to the operation amount arbitration unit 22. The suspension control unit 24 transmits the action information of each suspension 13 to the operation amount arbitration unit 22. The steering control unit 25 transmits the action information of each steer 14 to the operation amount arbitration unit 22. The brake control unit 26 transmits the action information of each brake 15 to the operation amount arbitration unit 22. The stabilizer control unit 27 transmits the action information of each stabilizer 16 to the operation amount arbitration unit 22.

<Flowchart>

Figure 8:
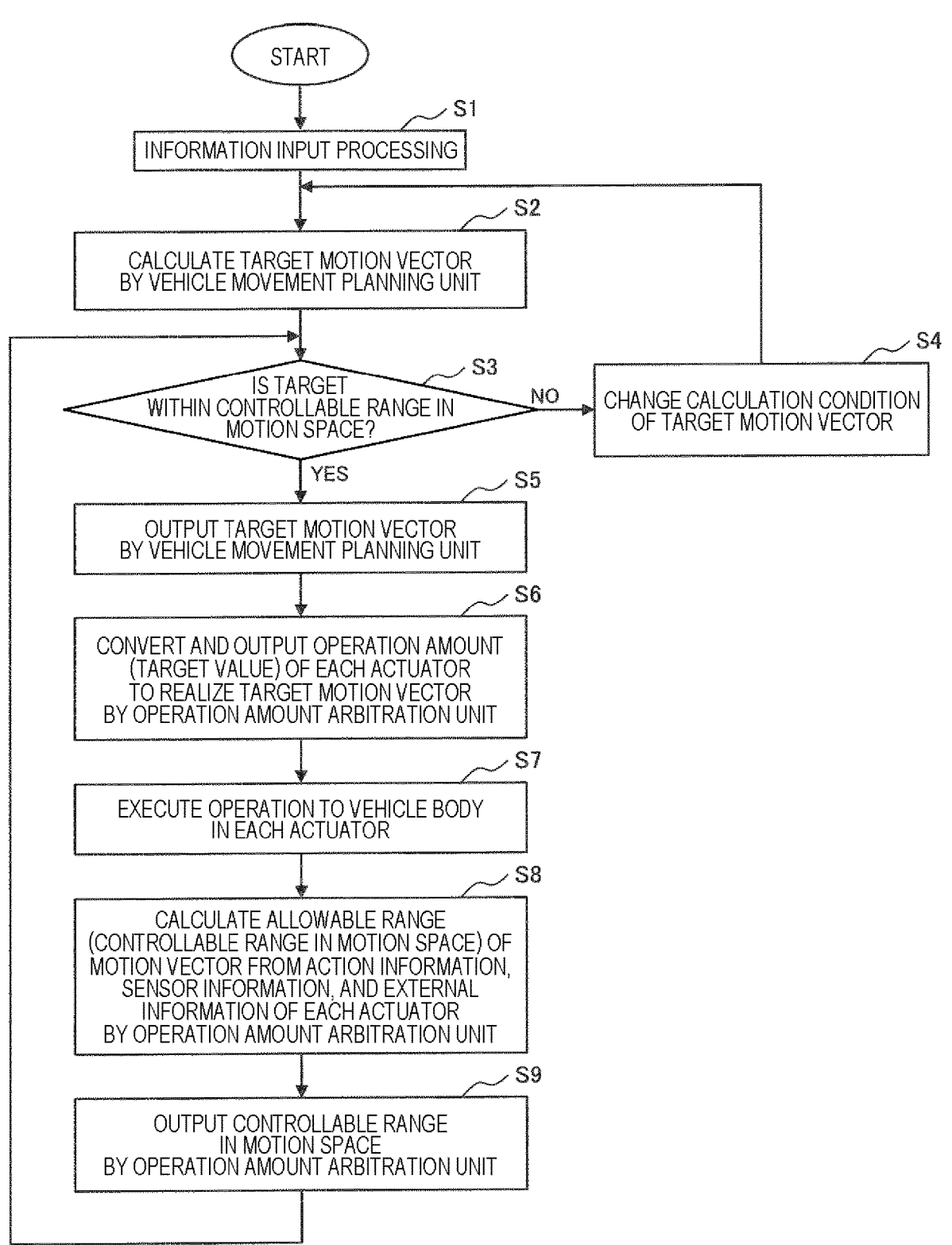
FIG. 8 is a flowchart illustrating processing of a vehicle movement control device according to an embodiment.

Next, the control contents of the vehicle movement control device 2 of the present embodiment will be described with reference to the flowchart of FIG. 8.

First, in step S1, the driver operation information, the external information, the sensor information, and the initial value (for example, FIG. 6) of the controllable range of the motion vector are input to the vehicle movement planning unit 21.

Next, in step S2, the vehicle movement planning unit 21 calculates a target motion vector in accordance with the travel state based on the input driver operation information and the like (for example, steering information). The target motion vector calculated here may be, for example, a facial vector that defines a vehicle movement with six degrees of freedom, that is, an acceleration Gx in the front-rear direction, an acceleration Gy in the lateral direction, an acceleration Gz in the vertical direction, the roll angle φ, the pitch angle θ, and the yaw rate r as illustrated in FIG. 5A, or may be a facial vector that defines a vehicle movement with six degrees of freedom, that is, the acceleration Gx in the front-rear direction, the acceleration Gy in the lateral direction, the position Z in the vertical direction, the roll angle φ, the pitch angle θ, and the yaw rate r as illustrated in FIG. 5B.

In step S3, the vehicle movement planning unit 21 determines whether the calculated target motion vector is within the controllable range of the motion vector input from the operation amount arbitration unit 22. Then, when it is out of the range, the processing proceeds to step S4, and when it is within the range, the processing proceeds to step S5.

In step S4, the vehicle movement planning unit 21 changes a calculation condition of the target motion vector. For example, the upper limits of the acceleration Gx in the front-rear direction, the roll angle φ, the pitch angle θ, and the like are further reduced.

On the other hand, in step S5, the vehicle movement planning unit 21 outputs the target motion vector confirmed to be within the controllable range.

In step S6, the operation amount arbitration unit 22 calculates and outputs the operation amount (target value) of each actuator such that the vehicle movement with six degrees of freedom defined by the target motion vector output by the vehicle movement planning unit 21 can be realized.

In step S7, the motor control unit 23 to the stabilizer control unit 27 control each actuator based on the operation amount of each actuator output by the operation amount arbitration unit 22, and change the vehicle movement in accordance with the travel state. In addition, the motor control unit 23 to the stabilizer control unit 27 transmit the action information of each actuator to the operation amount arbitration unit 22.

In step S8, the operation amount arbitration unit 22 calculates the controllable range of the motion vector based on the action information of each actuator, the sensor information, and the external information. For example, when the vehicle 1 is accelerating, the operation amount arbitration unit 22 calculates the controllable range of the three-dimensional shape in which the positive direction side of the Ax axis is eroded as illustrated in FIG. 7(a).

In step S9, the operation amount arbitration unit 22 outputs the controllable range of the motion vector calculated in step S8 to the vehicle movement planning unit 21. Thereafter, the processing returns to step S3.

Then, in step S3 again, the vehicle movement planning unit 21 determines whether the current target motion vector falls within the controllable range of the motion vector updated in step S9. As a result of this series of processing, the target motion vector planned by the vehicle movement planning unit 21 always falls within the controllable range calculated by the operation amount arbitration unit 22 in accordance with the travel state.

As described above, according to the present embodiment, after the controllable range of the motion vector is updated in accordance with the action state of each actuator, the target motion vector is recalculated to fall within the updated controllable range. Therefore, for example, even during steering of the vehicle 1, the operation amount of each actuator can be set to improve ride comfort of the occupant and operation feeling of the driver.

<Application Example to Actual Environment>

Next, effects in a case where the vehicle movement control device 2 of the present embodiment is applied to an actual environment will be described with reference to FIGS. 9 to 12.

Figure 9:
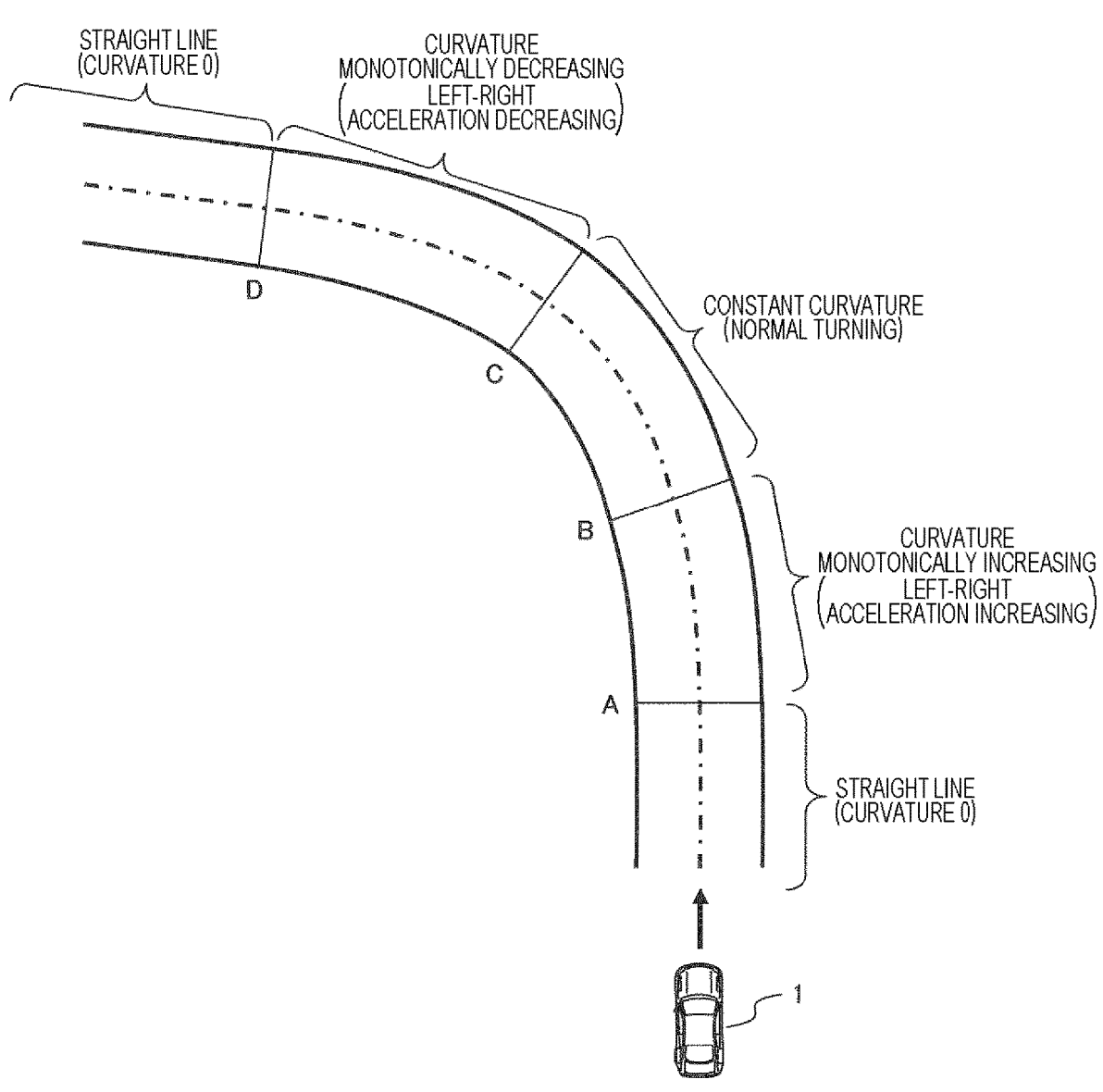
FIG. 9 is a plan view illustrating a situation where a vehicle enters a left curve.
Figure 10:
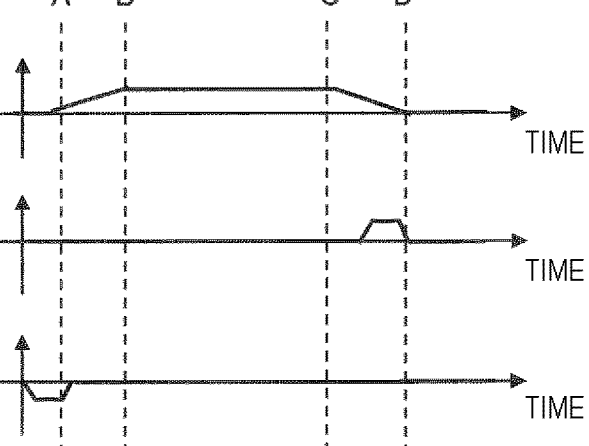
FIG. 10 is a graph illustrating driver operation information and a target motion vector in FIG. 9.
Figure 10:
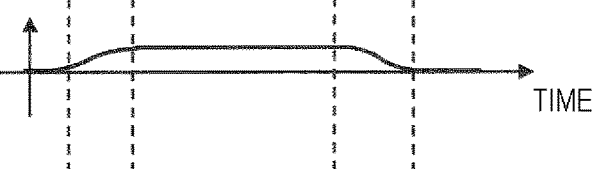
Figure 10:
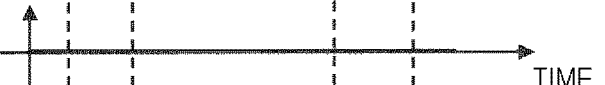
Figure 10:
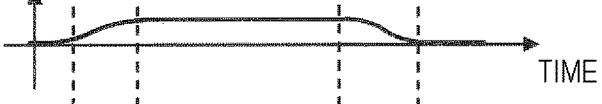
Figure 10:
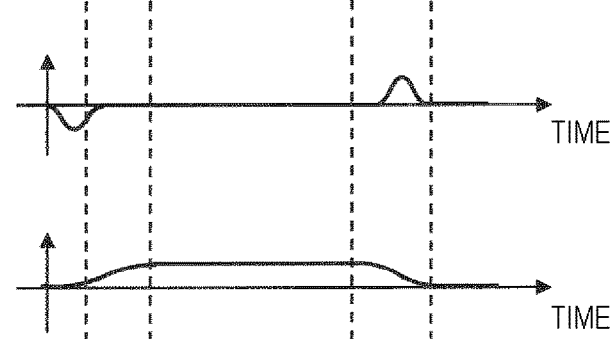

FIG. 9 is a plan view illustrating a situation in which the vehicle 1 enters the left curve, in which a section up to a point A is a straight section, a section from the point A to a point B is a curvature monotonically increasing section, a section from the point B to a point C is a curvature constant section, a section from the point C to a point D is a curvature monotonically decreasing section, and a section from the point D is a straight section. In addition, FIG. 10 is a graph illustrating driver operation information and target motion vectors in time series in the vehicle 1 of FIG. 9.

As illustrated in FIG. 10(a), the driver gradually increases the steering amount in the curvature monotonically increasing section (A to B), keeps the steering amount constant in the curvature constant section (B to C), and gradually decreases the steering amount in the curvature monotonically decreasing section (C to D). In addition, for a so-called slow-in-first-out, a deceleration pedal is operated before entering the curvature monotonically increasing section (A to B), and an acceleration pedal is operated before exiting the curvature monotonically decreasing section (C to D). When these pieces of driver operation information are input, the vehicle movement planning unit 21 of the present embodiment calculates a target motion vector that changes as illustrated in FIG. 10(b).

FIG. 11 is a graph comparing the lateral acceleration and the like (dotted line) generated when the vehicle 1 is controlled without using the present invention with the lateral acceleration and the like (solid line) generated when the vehicle 1 is controlled based on the target motion vector of FIG. 10(b). That is, as illustrated in FIG. 11, according to the present embodiment, (a) the lateral acceleration Ay, (b) the front-rear acceleration Ax, and (e) the pitch angle θ change more smoothly, (c) a fluctuation of the vertical acceleration Az disappears, and (d) the roll angle φ changes from a right inclination facing the opposite direction of the turning direction to a left inclination facing the turning direction. As a result, ride comfort of the occupant and operation feeling of the driver are improved. Although FIG. 11 illustrates only before and after the curvature monotonically increasing section (A to B), the same effect can be obtained before and after the curvature monotonically decreasing section (C to D).

In addition, FIG. 12 is a graph for explaining effects other than those illustrated in FIG. 11. FIG. 12(a) is a diagram illustrating a relationship between the front-rear acceleration Ax and the lateral acceleration Ay generated in the vehicle 1. As illustrated herein, the diagram of the related art (dotted line) has a substantially regular triangular shape, and there is a timing at which the relationship between both accelerations suddenly changes, whereas the diagram of the present embodiment (solid line) has a substantially circular shape, and there is no timing at which the relationship between both accelerations suddenly changes. Therefore, according to the present embodiment, it can be seen that the accelerations Ax and Ay cooperate to improve ride comfort and operation feeling.

On the other hand, FIG. 12(b) is a graph illustrating a relationship between the lateral acceleration Ay (broken line) and the roll generated with a delay from the lateral acceleration Ay due to the mechanical characteristic of the vehicle 1. As illustrated here, the roll (dotted line) of the related art not only has a large delay from the lateral acceleration Ay (broken line), but also has a different graph shape. On the other hand, in the roll (solid line) of the present embodiment, not only is the delay from the lateral acceleration Ay (broken line) relatively small, but also the graph shapes substantially match. Therefore, according to the present embodiment, it can be seen that the roll delay with respect to the lateral acceleration Ay can be suppressed, and the lateral acceleration Ay and the change shape of the roll can be matched, such that ride comfort and the operation feeling are improved.

According to the vehicle movement control device of the present embodiment described above, a target motion vector that falls within a desired controllable range in the motion space is generated, and the operation amount of each actuator is integrally controlled to realize the vehicle movement defined by the target motion vector, thereby improving ride comfort and operation feeling.

REFERENCE SIGNS LIST 1 vehicle
10 vehicle body
11 wheel
12 motor
13 suspension
14 steer
15 brake
16 stabilizer
17 lower arm
2 vehicle movement control device
21 vehicle movement planning unit
22 operation amount arbitration unit
23 motor control unit
24 suspension control unit
25 steering control unit
26 brake control unit
27 stabilizer control unit
Fx braking/driving force
Jx jack-up force by braking/driving force
Fy lateral force
Jy jack-up force by lateral force
Ax front-rear acceleration
Ay lateral acceleration
Az vertical acceleration
φ roll angle
θ pitch angle
r yaw rate

The invention claimed is:

1. A vehicle movement control device that controls a vehicle movement by integrally controlling a plurality of actuators in accordance with a travel state, the vehicle movement control device comprising:

a vehicle movement planning unit configured to generate a target motion vector based on input travel state information;

an operation amount arbitration unit configured to calculate an operation amount of each actuator based on the target motion vector; and an actuator control unit configured to control each actuator based on the operation amount of each actuator, wherein the vehicle movement planning unit generates the target motion vector within a controllable range in a motion space, the controllable range having a three-dimensional shape that changes based on a reserve power of actuators available for improving ride comfort and operation feeling, acquired from the operation amount arbitration unit, and wherein the vehicle movement planning unit recalculates the target motion vector to fall within an updated controllable range when the controllable range is updated, wherein the target motion vector is disposed in a motion space comprising three axes of an acceleration in a front-rear direction, an acceleration in a lateral direction, and an acceleration in a vertical direction, the target motion vector defining the acceleration in the front-rear direction, the acceleration in the lateral direction, and the acceleration in the vertical direction at a start point, the target motion vector defining a roll angle and a pitch angle by an inclination, and the target motion vector defining a yaw rate by a posture.

2. The vehicle movement control device according to claim 1, wherein the travel state is a travel state defined by driver operation information, external information, or sensor information of a vehicle body.

3. The vehicle movement control device according to claim 1, wherein the target motion vector defines a vehicle movement with six degrees of freedom comprising the acceleration in the front-rear direction, the acceleration in the lateral direction, the acceleration in the vertical direction, the roll angle, the pitch angle, and the yaw rate.

4. The vehicle movement control device according to claim 1, wherein the target motion vector is a vector defining a vehicle movement with six degrees of freedom comprising the acceleration in the front-rear direction, the acceleration in the lateral direction, a position in a vertical direction, the roll angle, the pitch angle, and the yaw rate.

5. The vehicle movement control device according to claim 1, wherein the controllable range includes a lower flat ball portion defining a settable range of a start point of a motion vector and an upper truncated cone portion defining an inclinable range of the motion vector.

6. The vehicle movement control device according to claim 1, wherein during acceleration of the vehicle, the controllable range has a three-dimensional shape in which a positive direction side of a front-rear acceleration axis is eroded compared to when a vehicle travels at a constant speed.

7. The vehicle movement control device according to claim 1, wherein the vehicle movement planning unit changes a calculation condition of the target motion vector when the target motion vector is out of the controllable range.

8. The vehicle movement control device according to claim 1, wherein the plurality of actuators include in-wheel type motors attached to each wheel, wherein each wheel independently rotates by one or more motors.

9. The vehicle movement control device according to claim 1, wherein the plurality of actuators include active suspensions provided between each motor and a vehicle body.

10. The vehicle movement control device according to claim 1, wherein the plurality of actuators include control stabilizers that electrically arbitrate a torsion angle to suppress a roll amount of the vehicle.

11. The vehicle movement control device according to claim 1, wherein the operation amount arbitration unit actively generates desired pitching or rolling by arbitrating the operation amount of each actuator.

12. The vehicle movement control device according to claim 1, wherein the target motion vector is a facial vector disposed in the motion space.

13. A vehicle movement control device that controls a vehicle movement by integrally controlling a plurality of actuators in accordance with a travel state, the vehicle movement control device comprising:

a vehicle movement planning unit configured to generate a target motion vector based on input travel state information;

an operation amount arbitration unit configured to calculate an operation amount of each actuator based on the target motion vector; and an actuator control unit configured to control each actuator based on the operation amount of each actuator, wherein the vehicle movement planning unit generates the target motion vector within a controllable range in a motion space, the controllable range having a three-dimensional shape that changes based on a reserve power of actuators available for improving ride comfort and operation feeling, acquired from the operation amount arbitration unit, and wherein the vehicle movement planning unit recalculates the target motion vector to fall within the updated controllable range when the controllable range is updated, wherein the target motion vector is disposed in a motion space including three axes of an acceleration in a front-rear direction, an acceleration in a lateral direction, a position in a vertical direction, the target motion vector defining the acceleration in the front-rear direction, the acceleration in the lateral direction, and the position in the vertical direction at a start point, the target motion vector defining a roll angle and a pitch angle by an inclination, and the target motion vector defining a yaw rate by a posture.

14. The vehicle movement control device according to claim 13, wherein the controllable range includes a lower flat ball portion defining a settable range of a start point of the motion vector and an upper truncated cone portion defining an inclinable range of the motion vector.

15. A vehicle movement control device that controls a vehicle movement by integrally controlling a plurality of actuators in accordance with a travel state, the vehicle movement control device comprising:

a vehicle movement planning unit configured to generate a target motion vector based on input travel state information;

an operation amount arbitration unit configured to calculate an operation amount of each actuator based on the target motion vector; and an actuator control unit configured to control each actuator based on the operation amount of each actuator, wherein the vehicle movement planning unit generates the target motion vector within a controllable range in a motion space, the controllable range having a three-dimensional shape that changes based on a reserve power of actuators available for improving ride comfort and operation feeling, acquired from the operation amount arbitration unit, and wherein the vehicle movement planning unit recalculates the target motion vector to fall within the updated controllable range when the controllable range is updated, wherein the actuator control unit transmits action information of each actuator to the operation amount arbitration unit, and the operation amount arbitration unit updates a controllable range in the motion space based on the action information of each actuator.

16. The vehicle movement control device according to claim 15, wherein when the operation amount arbitration unit updates the controllable range in the motion space, the vehicle movement planning unit generates the target motion vector within the controllable range updated by the operation amount arbitration unit.

17. A vehicle movement control method for controlling a vehicle movement by integrally controlling a plurality of actuators in accordance with a travel state, the vehicle movement control method comprising:

generating, by a vehicle movement planning unit, a target motion vector within a controllable range in a motion space, the controllable range having a three-dimensional shape that changes based on a reserve power of actuators available for improving ride comfort and operation feeling, based on input travel state information;

calculating, by an operation amount arbitration unit, an operation amount of each actuator based on the target motion vector;

controlling, by an actuator control unit, each actuator based on the operation amount of each actuator; and updating, by the operation amount arbitration unit, the controllable range in the motion space based on action information of each actuator; and recalculating, by the vehicle movement planning unit, the target motion vector to fall within an updated controllable range when the controllable range is updated, wherein generating the target motion vector within the controllable range in the motion space is acquired from the operation amount arbitration unit.

18. The vehicle movement control method according to claim 17, further comprising changing, by the vehicle movement planning unit, a calculation condition of the target motion vector when the target motion vector is out of the controllable range.

* * * * *